United States Patent
Li

(10) Patent No.: US 10,656,961 B2
(45) Date of Patent: May 19, 2020

(54) METHOD AND APPARATUS FOR OPERATING A PLURALITY OF OPERATING SYSTEMS IN AN INDUSTRY INTERNET OPERATING SYSTEM

(71) Applicants: KYLAND TECHNOLOGY CO., LTD, Shijingshan District, Beijing (CN); CoreTek Systems Incorporated, Haidian District, Beijing (CN)

(72) Inventor: Yan Li, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 201 days.

(21) Appl. No.: 15/859,432

(22) Filed: Dec. 30, 2017

(65) Prior Publication Data
US 2019/0004846 A1    Jan. 3, 2019

(30) Foreign Application Priority Data
Jul. 3, 2017 (CN) .............................. 201710534181

(51) Int. Cl.
*G06F 9/455* (2018.01)
*G06F 9/50* (2006.01)

(52) U.S. Cl.
CPC ............ *G06F 9/45558* (2013.01); *G06F 9/50* (2013.01); *G06F 9/5077* (2013.01)

(58) Field of Classification Search
CPC ....... G06F 9/45558; G06F 9/50; G06F 9/5077
See application file for complete search history.

(56) References Cited

U.S. PATENT DOCUMENTS 6,075,938 A      6/2000  Bugnion et al.
2008/0086729 A1*  4/2008  Kondoh ................ G06F 9/5077
                                                          718/1
(Continued)

FOREIGN PATENT DOCUMENTS

CN      101606128 A    12/2009
CN      101727351 A     6/2010
(Continued)

OTHER PUBLICATIONS

Sandstrom Kristian et al, Virtualization technologies in embedded real-time systems, 2013 IEEE 18th Conference on Emerging Technologies & Factory Automation (ETFA), Sep. 10, 2013 ; (Sep. 10, 2013), pp. 1-8, IEEE.

*Primary Examiner* — Eric C Wai
*Assistant Examiner* — Jorge A Chu Joy-Davila
(74) *Attorney, Agent, or Firm* — Arent Fox LLP; Michael Fainberg

(57) ABSTRACT

Disclosed are a method and apparatus for running a plurality of operating systems in an industry internet operating system, wherein the industry internet operating system includes application layer, cloud control layer, and field layer; the cloud control layer includes an industry real-time cloud operating system module configured to acquire and analyze data between the cloud control layer and the application layer, and to transmit a control instruction to the field layer; and the method includes: running a first core of a multi-core CPU in a VMX mode using a preset virtualization technology, creating at least one VM in the first core of the multi-core CPU, and running a first operating system on a VM in the first core, wherein each VM corresponds respectively to a logic partition; and running a second operating system directly on a physical partition in a second core of the multi-core CPU.

11 Claims, 4 Drawing Sheets

(56) References Cited

U.S. PATENT DOCUMENTS

| | | | |
|---|---|---|---|
| 2009/0019442 A1* | 1/2009 | Liu | G06F 9/45533 |
| | | | 718/102 |
| 2009/0192639 A1* | 7/2009 | Cellier | G06F 9/52 |
| | | | 700/94 |
| 2015/0120979 A1 | 4/2015 | Imada et al. | |
| 2016/0188474 A1 | 6/2016 | Wang et al. | |
| 2018/0060142 A1* | 3/2018 | Skeffington | G05B 15/02 |

FOREIGN PATENT DOCUMENTS

| | | |
|---|---|---|
| CN | 102110023 A | 6/2011 |
| CN | 103150217 A | 6/2013 |
| CN | 104516782 A | 4/2015 |
| CN | 106873553 A | 6/2017 |
| WO | 2015/103376 A1 | 7/2015 |
| WO | 2016/172514 A1 | 10/2016 |

\* cited by examiner

METHOD AND APPARATUS FOR OPERATING A PLURALITY OF OPERATING SYSTEMS IN AN INDUSTRY INTERNET OPERATING SYSTEM

CROSS REFERENCE TO RELATED APPLICATION

This application claims priority to Chinese Patent Application No. 201710534181.X, filed with the Chinese Patent Office on Jul. 3, 2017. The entire disclosure of the above application is incorporated herein by reference.

FIELD

The present disclosure relates to the field of embedded operating systems, and particularly to a method and apparatus for operating a plurality of operating systems in an industry internet operating system.

BACKGROUND

An Embedded Operating System (EOS) refers to an operating system for an embedded system, and is a widely applied piece of system software due to its high real-time characteristic, high specialty, operational convenience and easiness, and other advantages. At present, the embedded operating system is generally categorized into a multi-thread embedded operating system, a multi-process and multi-thread embedded operating system, and a virtualized embedded operating system.

In the prior art, a Central Processing Unit (CPU) can only run one of a plurality of embedded operating systems, but can not run more than one of them concurrently, so the use of only a single CPU can not accommodate application scenarios with different demands, and consequently can not be applicable to a number of application scenarios, thus degrading the operability and the performance thereof in use.

SUMMARY

Embodiments of the disclosure provide a method and apparatus for operating a plurality of operating systems in an industry internet operating system so as to address the problem in the prior art that a CPU can only run one of embedded operating systems, and thus can not accommodate application scenarios with different demands.

Technical solutions according to the embodiments of the disclosure are as follows.

A method for running a plurality of operating systems in an industry internet operating system is provided, where the industry internet operating system includes application layer devices, cloud control layer devices, and field layer devices; the cloud control layer devices include an industry real-time cloud operating system module configured to acquire and analyze data between the cloud control layer and the application layer, and to transmit a control instruction to the field layer; and the method is applicable to the industry real-time cloud operating system module, and includes: running a first core of a multi-core Central Processing Unit (CPU) in a Virtual Machine eXtensions (VMX) mode using a preset virtualization technology, creating at least one Virtual Machine (VM) in the first core of the multi-core CPU, and running a first operating system on a VM in the first core, where each VM corresponds respectively to a logic partition; and running a second operating system directly on a physical partition in a second core of the multi-core CPU.

An apparatus for running a plurality of operating systems in an industry internet operating system is provided, where the industry internet operating system includes application layer devices, cloud control layer devices, and field layer devices; the cloud control layer devices include an industry real-time cloud operating system module configured to acquire and analyze data with the application layer, and to transmit a control instruction to the field layer; and the apparatus is applicable to the industry real-time cloud operating system module, and includes: one or more processors; and a memory, where one or more computer readable program codes are stored in the memory, and the one or more processors are configured to execute the one or more computer readable program codes to perform: running a first core of a multi-core Central Processing Unit (CPU) in a VMX mode using a preset virtualization technology, to create at least one Virtual Machine (VM) in the first core of the multi-core CPU, and to run a first operating system on a VM in the first core, where each VM corresponds respectively to a logic partition; and running a second operating system directly on a physical partition in a second core of the multi-core CPU.

An embodiment of the disclosure provides a computer readable storage medium on which there is stored computer program which, upon being executed by one or more processor, perform the method for running a plurality of operating systems in an industry internet operating system according to any one of the embodiments above.

DETAILED DESCRIPTION OF THE EMBODIMENTS

The technical solutions according to the embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those ordinarily skilled in the art without any inventive effort shall fall into the scope of the disclosure.

Figure 1:
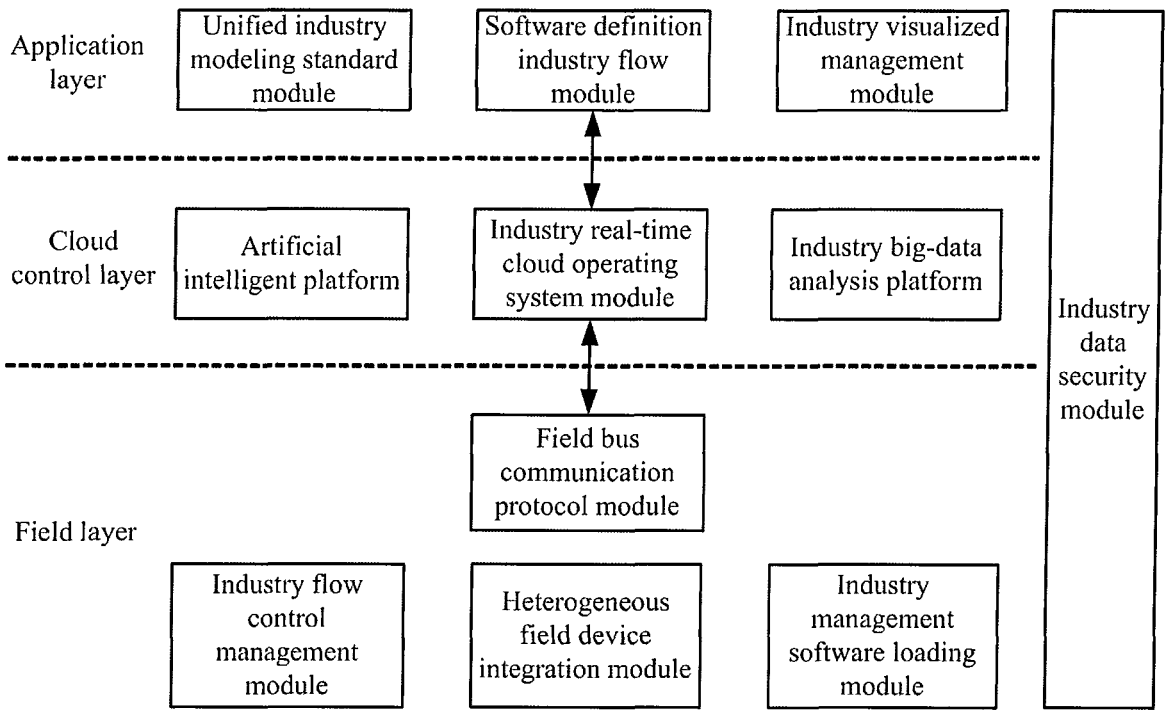
FIG. 1 is a functional architectural diagram of an industry internet operating system according to an embodiment of the disclosure.

In a real application, an industry internet operating system is an underlying system enabling industry control over a network, cloud industry control, a visualized factory, an analysis of industry big-data, etc., and also a unified system enabling a control information flow, a management information flow, and a supply chain information flow to be integrated with each other, and it is a reliable guarantee for the controllability of an industry field. As illustrated in FIG. 1, the industry internet operating system at least includes an application layer, a cloud control layer, and a field layer. Where the application layer includes at least a unified industry modeling standard module, a software definition industry flow module, and an industry visualized management module; the cloud control layer includes at least an industry real-time database, an artificial intelligent platform, and an industry big-data analysis platform; and the field layer includes at least a field bus communication protocol module, an industry flow control management module, a heterogeneous field device integration module, and an industry management software loading module. Furthermore the industry internet operating system further includes an industry data security module across the application layer, the cloud control layer, and the field layer. For the industry real-time operating system module, there is a technical problem in the prior art that a Central Processing Unit (CPU) can only run one of embedded operating systems, and thus can not accommodate application scenarios with different demands.

In order to address the technical problem above, in the embodiments of the disclosure, in the case where a logic partition and a physical partition coexist for a multi-core CPU, a virtualization technology is adopted for the first core by running a first operating system on a Virtual Machine (VM) of the first core, and no virtualization technology is adopted for the second core but running a second operating system directly on the second core.

The solution according to the disclosure will be described below in details in connection with particular embodiments thereof, and of course, the disclosure will not be limited the following embodiments.

Figure 2:
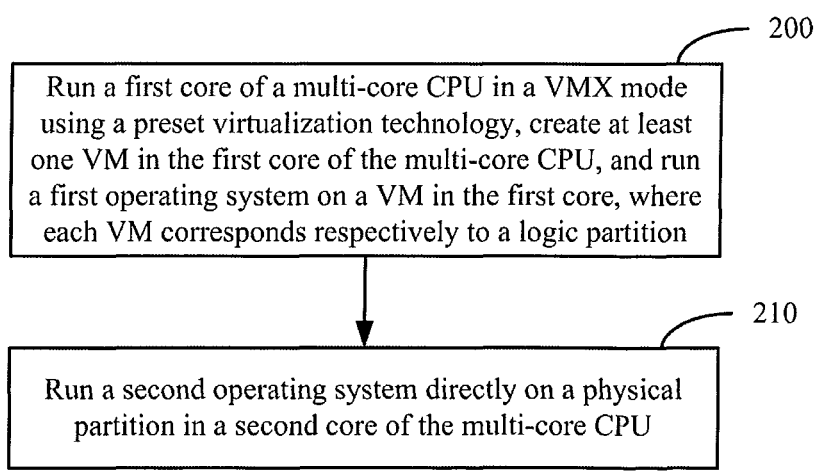
FIG. 2 is a flow chart of a method for running a plurality of operating systems in an industry internet operating system according to an embodiment of the disclosure.

Referring to FIG. 2, a particular flow of a method for running a plurality of operating systems in an industry internet operating system according to an embodiment of the disclosure is as follows:

The operation 200 is to run a first core of a multi-core CPU in a VMX mode using a preset virtualization technology, to create at least one VM in the first core of the multi-core CPU, and to run a first operating system on a VM in the first core, where each VM corresponds respectively to a logic partition.

Here the industry internet operating system includes application layer devices, cloud control layer devices, and field layer devices; and the cloud control layer devices include an industry real-time cloud operating system module configured to acquire and analyze data between the cloud control layer and the application layer, and to transmit a control instruction to the field layer. In the embodiment of the disclosure, the method for running a plurality of operating systems is applicable to the industry real-time cloud operating system module.

In reality, the multi-core CPU includes at least two cores independent of each other.

In the embodiment of the disclosure, in order to run the different operating systems in the multi-core CPU, some core(s) in the multi-core CPU is(are) virtualized using the preset virtualization technology to create at least one VM, and then the first operating system is started to run on the VM.

Here the preset virtualization technology can be the VT-x technology, for example, where VT-x is a set of instructions in the Virtualization technology of Intel Corp., to improve the flexibility and stability of a software-based virtualization solution.

Here the multi-core CPU can be a CPU in the x86 architecture, for example, or can be another type of CPU, but the embodiment of the disclosure will not be limited thereto.

Furthermore the at last one VM is managed using a Virtual Machine Monitor (VMM) in the first core, where the at least one VM is run in a non-root state, and the VMM is run in a root state.

Stated otherwise, the first core can include one VMM, and a plurality of VMs, on each of which a standalone operating system can be run.

For example, for one of the cores in the multi-core CPU, e.g., a core 1, a standalone VMM is run on core 1 in the root state, and two VMs, i.e., two logic partitions, which are run in the non-root state are created in the core 1, so that two different operating systems can be run respectively on the two VMs.

It shall be noted that in the embodiment of the disclosure, if the multi-core CPU includes a plurality of cores in the VMX mode, then each core in the VMX mode may include only one VMM, that is the VMM is run only on the single core, each core runs a standalone VMM entity, and the VMMs in the respective cores do not intervene each other, so that the VMM is run only on the single core so that the security and reliability of the VMM can be further improved.

Furthermore if the multi-core CPU includes a plurality of cores in the VMX mode, then the logic partitions of the plurality of cores in the VMX mode can be integrated by partitions integrating method, and the first operating system may be run concurrently on the VMs corresponding to the plurality of cores in the VMX mode.

For example, there are two cores in the VMX mode, which are a core 1 including a VM1 and a VMM1, and a core 2 including a VM2 and a VMM2 respectively, in the multi-core CPU, then logic partitions corresponding respectively to the VM1 and the VM2 may be integrated so that an operating system can be run concurrently on the VM1 and the VM2 in the core 1 and the core 2, that is, an operating system entity can exclusively access both of these two cores in the VMX mode.

Here the first operating system is run on the VM in the first core in either of a host mode and a guest mode.

Particularly 1) in the host mode, after the CPU is powered on, and a Basic Input and Output System (BIOS) is started, an image of the VMM is started directly into operation, and after the VMM performs some general process, for example, after it allocates a resource, the VMM runs the core thereof in the VMX mode, and the VM on the VMM starts an image of Windows (i.e., the first operating system) into operation. The VMM substantially does not operate while Windows is operating.

2) In the guest mode, after the CPU is powered on, and the BIOS is started, the image of the VMM is started directly into operation, and after the VMM performs some general process, for example, after it allocates a resource, the VMM runs the core thereof in the VMX mode, and the VM on the VMM starts an image of Windows into operation. The VMM virtualizes correspondingly a device accessed by Windows while Windows is operating.

Furthermore if a plurality of VMs are created in the first core of the multi-core CPU, then the plurality of VMs running the first operating system may be scheduled as follows.

Firstly if a first timer for controlling the switch of a time window in a schedule, and a second timer for controlling the switch of a primary frame period of time in the schedule are preset in a schedule, then it will be determined whether the current instance of time lies in a non-idle time window in the schedule, where the primary frame period of time is the sum of the lengths of the respective time windows in the schedule.

Here the schedule includes several time windows including a non-idle time window and an idle time window, where the non-idle time window corresponds to a period of time for which a virtual machine is run, and no virtual machine is run in the idle time window.

Then if the current instance of time lies in a non-idle time window in the schedule, then a first VM in a ready state will be obtained from the non-idle time window, and run.

If the current instance of time does not lie in a non-idle time window in the schedule, a second VM in a ready state will be obtained from a priority ready queue, and run.

Furthermore each of a plurality of second VMs is run in turn at a periodicity of a preset length of time.

Then in the embodiment of the disclosure, the plurality of VMs can be scheduled into operation in a hybrid scheduling mode in which the schedule, the priority scheduling algorithm, and the time slice-based scheduling algorithm are combined to thereby satisfy service demands of different users, and the first timer and the second timer are preset in the schedule to control the switches of the time window and the primary frame period of time respectively, thus avoiding in effect a delay in switching the virtual machine and the primary frame due to the use of a system clock in the existing schedule.

Furthermore the plurality of VMs can communicate as follow.

Firstly a transmitting VM determines a zone space in a shared memory for a receiving VM with at least a read privilege.

Here the shared memory is a separate memory space allotted from a physical memory, and before the VMs are started, the VMM maps the shared memory to all the VMs with an access privilege according to a preset configuration table of the shared memory so that the VMs with an access privilege can access the shared memory directly, where the access privilege can include a read privilege, a write privilege, or a read/write privilege.

Here the preset configuration table of the shared memory can include the identifiers of the VMs allowed for an access, the starting physical address of the shared memory space, the size of the shared memory space, start logic addresses at which the respective VMs access the shared memory, and access privileges of the respective VMs to access the shared memory.

Furthermore the VMM allots a zone space block for each VM with an access privilege, and the VMs initialize the shared memory, install their own Inter-Processor Interrupt (IPI) interruption handling functions, and create tasks for handling requests. Initially the respective VMs need to initialize their own zone spaces.

Stated otherwise, the VMM pre-configures the shared memory, and presets the configuration table of the shared memory, so that the respective VMs can communicate data with each other through the shared memory.

Then the transmitting VM writes first data into the zone space, and adds a data write request into the zone space, where the data write request carries the identifier of the position of the first data in the zone space, the identifier of the transmitting VM, and an operation type of the request.

Lastly the transmitting VM receives second data returned by the receiving VM, where the second data is obtained by the receiving VM after it obtains the data write request, obtains the first data according to the identifier of the position, and then operates correspondingly on the first data according to the operation type of the request.

This in the embodiment of the disclosure, the VMs can communicate with each other through the shared memory pre-configured by the VMM instead of the VMM, thus addressing the problem that if the virtual machines access the shared memory, then the VMM will have to switch the virtual machines frequently to check them for security, and to authorize their pages, so as to improve the efficiency of communication.

The operation 210 is to run a second operating system directly on a physical partition in a second core of the multi-core CPU.

Stated otherwise, in the embodiment of the disclosure, no virtualization function is started for the second core but running the second operating system directly on the bare second core, i.e., the physical partition of the second core.

Here the physical partition communicates with the logic partition, and the logic partition communicates with another logic partition, in either of the following modes.

Remote Procedure Call Protocol (RPC) communication or standard socket interface based communication.

Thus the second operating system in the second core can access a corresponding function and application in the first operating system in the first core in the communication modes above.

In one or more embodiment, the first operating system is a system requiring higher security, but being less real-time, and the second operating system is a system requiring being more real-time, so that the operating performance and efficiency of the system can be further improved.

Furthermore operating resources need to be allocated respectively for the first operating system and the second operating system to be run, particularly as follows.

Computer system resources are allocated respectively for the first operating system and the second operating system correspondingly according to a correspondence relationship between the computer system resources and the operating systems in a preset resource configuration table.

Here the resource configuration table can be preset by the user according to detected computer system resources and a real demand.

Thus the computer system resources are allocated respectively for the respective operating systems according to the preset resource configuration table so that the respective operating systems can access their allocated computer system resources separately.

In the embodiment of the disclosure, the first core is run in the VMX mode using the preset virtualization technology, at least one VM is created in the first core, and the first operating system is run on the VM in the first core, where each VM corresponds respectively to a logic partition; and the second operating system is run directly on the physical partition in the second core so that the logic partition and the physical partition coexist in the multi-core CPU, and furthermore the plurality of operating systems can be run concurrently in coordination on the multi-core CPU based on the physical partition and the logic partition in the multi-core CPU to thereby accommodate application scenarios with different demands.

Figure 3:
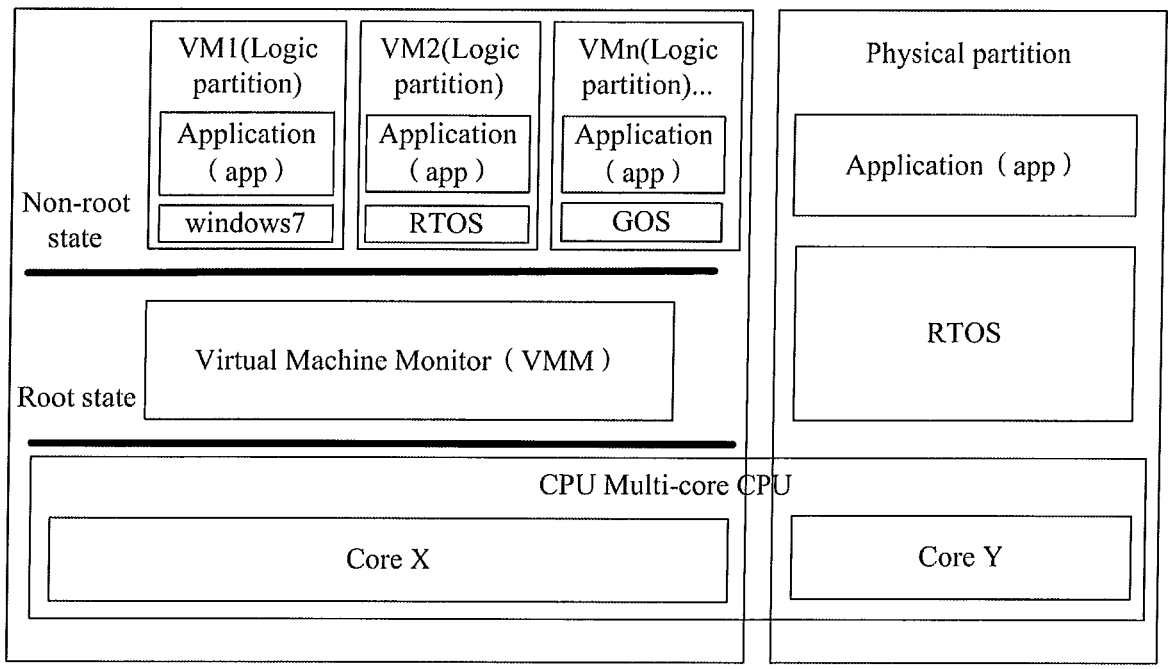
FIG. 3 shows a systematic structural diagram of a hybrid system running a plurality of operating systems according to an embodiment of the disclosure.

Referring to FIG. 3 which is a systematic structural diagram of a hybrid system running a plurality of operating systems according to an embodiment of the disclosure, the hybrid system includes:

A multi-core CPU including a plurality of cores, such as coreX and coreY.

1) The coreX is operated in the VMX mode using a preset virtualization technology to create at least one VM operating in the non-root state, and a VMM operating in the root state.

Here an operating system can be run on each VM, for example, Windows 7 is run on the VM1, a Real Time Operating System (RTOS) is run on the VM2, and a GOS system is run on the VMn, as illustrated in FIG. 2.

Furthermore partitions of the plurality of VMs of the different cores can be integrated so that one of the operating systems can be run concurrently on the VMs of the plurality of cores.

The VMM is run on a single core, each core can only run the standalone VMM to execute an image, and the VM can manage the plurality of VMs, virtual resources on the VMs, and resources for coordination. The plurality of cores on which the VMM is run to execute an image correspond to a plurality of VMM entities.

2) The VMM is disabled for the coreY, but the operating system is run directly on the bare coreY, and preferably, being used in a scenario where the operating system requires being more real-time. For example, the RTOS is run on the coreY, as illustrated in FIG. 2.

Here the physical partition communicates with the logic partition, and the logic partition communicates with another logic partition, at least in either of Remote Procedure Call Protocol (RPC) communication or standard socket interface based communication.

For example, the RTOS system in the CoreY can access a corresponding function and application in Windows 7 in the coreX via the RPC communication.

Stated otherwise, in the embodiment of the disclosure, the multi-core CPU can be partitioned so that the virtualization technology is adopted for the coreX, the VMX is enabled, the VM is created, the resource is allocated, the logic partition is allotted, and the first operating system is run on the VM; and the VMX is disabled for the coreY, but the second operating system is run directly on the physical partition of the coreY.

In the embodiment of the disclosure, the operating architecture of the hybrid system in which the plurality of operating system are run in coordination enables the logic partition and the physical partition to coexist, and it can be applicable to a number of application scenarios, and can run various types of operating systems concurrently, so that a multi-core CPU can accommodate application scenarios with different demands.

The embodiment above will be described below in further details in connection with several particular application scenarios thereof.

First Application Scenario

Figure 4:
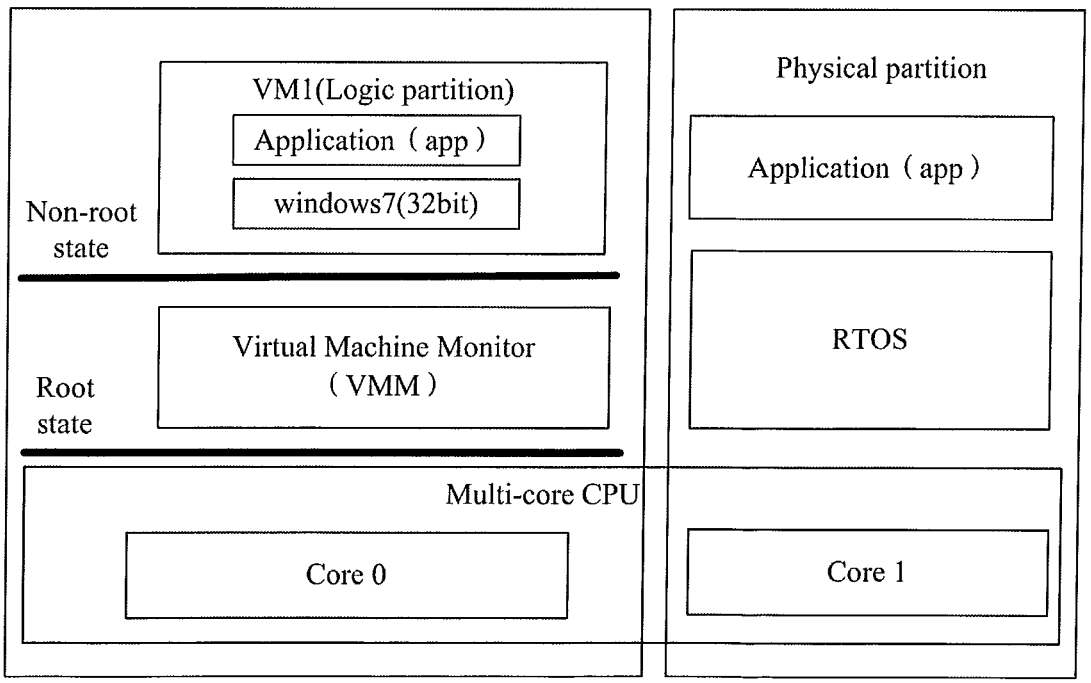
FIG. 4 shows a systematic structural diagram of a 2-core CPU running Windows 7 and RTOS in coordination according to an embodiment of the disclosure.

FIG. 4 shows a systematic structural diagram of a 2-core CPU running Windows 7 and RTOS in coordination according to an embodiment of the disclosure.

Referring to FIG. 4, the multi-core CPU includes two cores, which are core0 and core1 respectively, where the VMX is enabled, and there are a VM1, i.e., a logic partition, operating in the non-root state, and a VMM operating in the root state, on the core0; and the VMX is disabled, and there is a physical partition, on the core1.

For example, the Windows 7 and the RTOS are run in coordination as follows.

1) The Windows 7 is run on the VM1, and exclusively accesses the core0.

2) The RTOS is run directly on the physical core.

3) The RTOS can access a corresponding function in Windows 7 via the RPC communication.

In this way, the two different operating systems are run concurrently in coordination on the 2-core CPU.

Second Application Scenario

Figure 5:
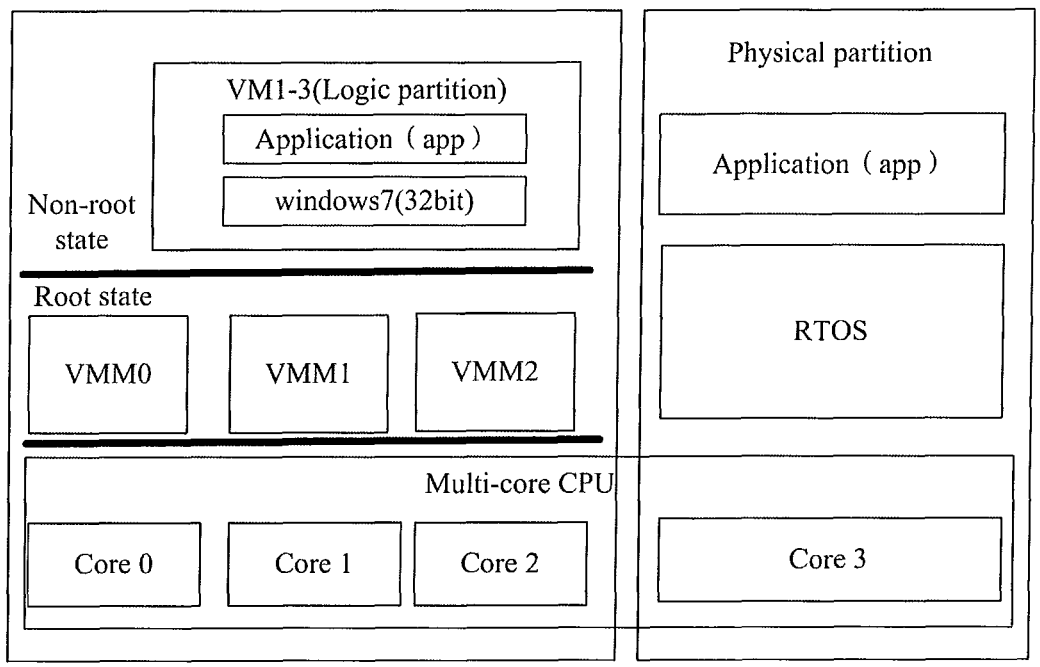
FIG. 5 shows a systematic structural diagram of a 4-core CPU running Windows 7 and RTOS in coordination according to an embodiment of the disclosure.

FIG. 5 shows a systematic structural diagram of a 4-core CPU running Windows 7 and RTOS in coordination according to an embodiment of the disclosure.

Referring to FIG. 5, the multi-core CPU includes four cores, which are core0, core1, core2, and core3 respectively, where one of the cores can be selected to run the RTOS, and the remaining three cores are configured to run the Windows 7; logic partitions of the core0, the core1, and the core2 can be integrated; and a standalone VMM entity is run on each of the core0, the core1, and the core2, and the VMMs do not interfere with each other.

For example, the Windows 7 and the RTOS are run in coordination as follows.

1) A Windows 7 entity is run on VM1, VM2, and VM3, where the VM1 exclusively accesses the core0, the VM2 exclusively accesses the core1, and the VM3 exclusively accesses the core2, so the Windows 7 entity exclusively accesses the core0, the core1, and the core2.

2) Standalone VM entities are run respectively on the core0, the core1, and the core2.

3) The RTOS is run directly on the core3.

4) The RTOS can access a corresponding function in the Windows 7 via the RPC communication.

In this way, the two different operating systems are run concurrently in coordination on the 4-core CPU.

Third Application Scenario

Figure 6:
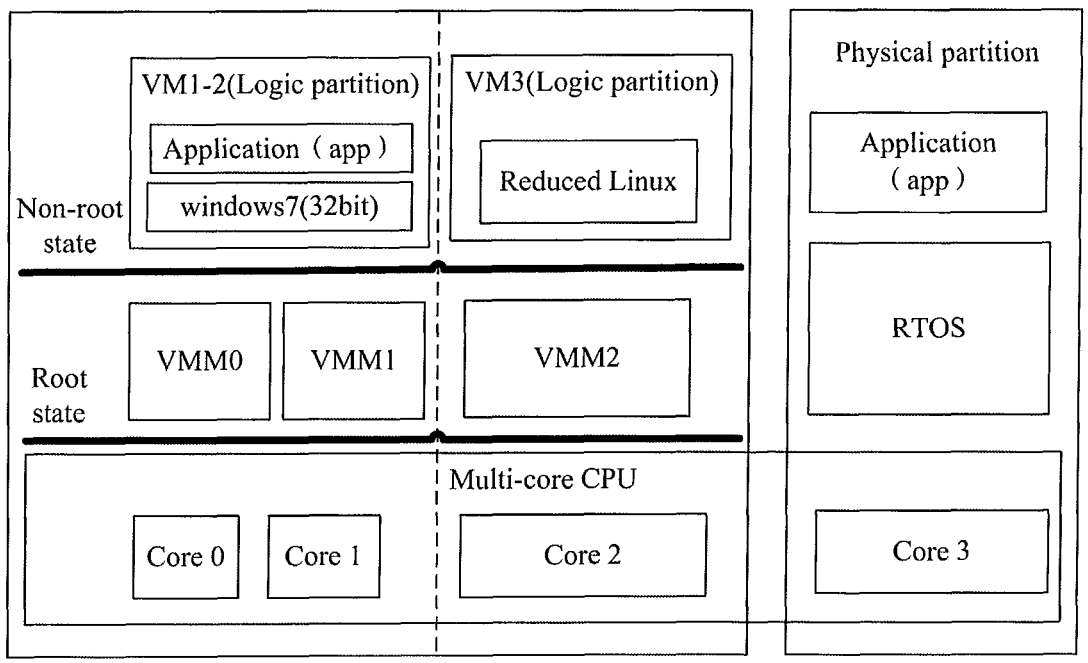
FIG. 6 shows a systematic structural diagram of a 4-core CPU running Windows 7, reduced Linux, and RTOS in coordination according to an embodiment of the disclosure.

FIG. 6 shows a systematic structural diagram of a 4-core CPU running Windows 7, reduced Linux, and RTOS in coordination according to an embodiment of the disclosure.

Referring to FIG. 6, the multi-core CPU includes four cores, which are core0, core1, core2, and core3 respectively, where the core3 is configured to run the RTOS, and all of the core0, the core1, and the core2 need to be virtualized; the Windows 7 can be run on the core0 and the core1, and the reduced Linux can be run on the core2; logic partitions of the core0 and the core1 can be integrated; and a standalone VMM entity is run on each of the core0, the core1, and the core2, and the VMMs do not interfere with each other.

For example, the Windows 7, the reduced Linux, and the RTOS are run in coordination as follows.

1) A Windows 7 entity is run on VM1 and VM2, where the VM1 exclusively accesses the core0, and the VM2 exclusively accesses the core1, so the Windows 7 entity exclusively accesses the core0 and the core1.

2) A reduced Linux entity is run on VM3, and exclusively accesses the core2.

3) Standalone VM entities are run respectively on the core0, the core1, and the core2.

4) The RTOS is run directly on the core3, the reduced Linux appears to the outside as a part of the RTOS, and the RTOS can access a corresponding file system, and a corresponding function in a network protocol stack, in the reduced Linux via the RPC communication.

5) The RTOS can access a corresponding function in the Windows 7 via the RPC communication mode, where the Windows 7 primarily provides a display function.

In this way, the three different operating systems are run concurrently in coordination on the 4-core CPU.

Figure 7:
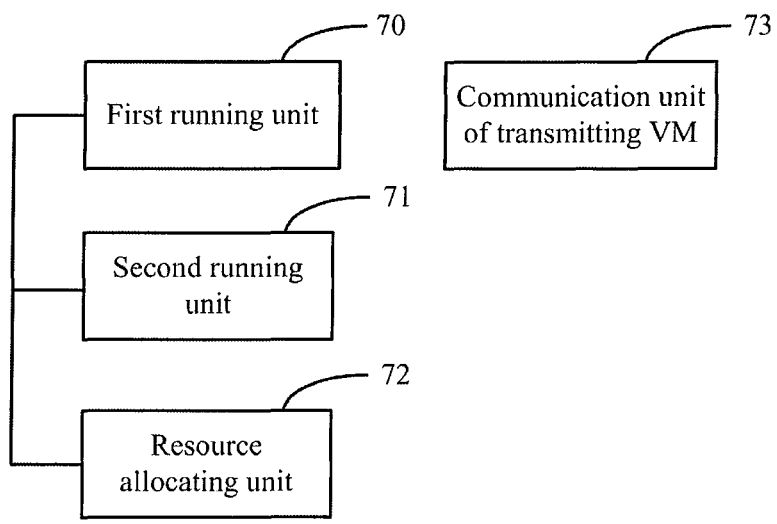
FIG. 7 is a schematic structural diagram of an apparatus for running a plurality of operating systems in an industry internet operating system according to an embodiment of the disclosure.

Based upon the embodiments above, referring to FIG. 7, an embodiment of the disclosure provides an apparatus for running a plurality of operating systems in an industry internet operating system, where the industry internet operating system includes application layer, cloud control layer, and field layer; the cloud control layer include an industry real-time cloud operating system module configured to acquire and analyze data between the cloud control layer and the application layer, and to transmit a control instruction to the field layer; and the apparatus is applicable to the industry real-time cloud operating system module, and particularly includes:

A first running unit 70 is configured to run a first core of a multi-core CPU in a VMX mode using a preset virtualization technology, to create at least one VM in the first core of the multi-core CPU, and to run a first operating system on a VM in the first core, where each VM corresponds respectively to a logic partition; and A second running unit 71 is configured to run a second operating system directly on a physical partition in a second core of the multi-core CPU.

In one or more embodiment, the first running unit 70 is further configured:

To manage the at least one VM using a VMM in the first core, to run the at least one VM in a non-root state, and to run the VMM in a root state.

In one or more embodiment, the first running unit 70 is further configured:

If the multi-core CPU includes a plurality of cores in the VMX mode, to integrate logic partitions of the plurality of cores in the VMX mode, and to run the first operating system concurrently on VMs corresponding to the plurality of cores in the VMX mode.

In one or more embodiment, if a plurality of VMs are created in the first core of the multi-core CPU, then the plurality of VMs running the first operating system will be scheduled, and the first operating system 70 will be further configured:

If a first timer for controlling the switch of a time window in a schedule, and a second timer for controlling the switch of a primary frame period of time in the schedule are preset in a schedule, to determine whether the current instance of time lies in a non-idle time window in the schedule, where the primary frame period of time is the sum of the lengths of the respective time windows in the schedule; and If the current instance of time lies in a non-idle time window in the schedule, to obtain a first VM in a ready state from the non-idle time window, and run the first VM;

If the current instance of time does not lie in a non-idle time window in the schedule, to obtain a second VM in a ready state from a priority ready queue, and run the second VM.

In one or more embodiment, the apparatus further includes a resource allocating unit 72 configured:

To allocate corresponding computer system resources respectively for the first operating system and the second operating system according to a correspondence relationship between the computer system resources and the operating systems in a preset resource configuration table.

In one or more embodiment, a communicating unit 73 of a transmitting VM is configured:

To determine a zone space in a shared memory for a receiving VM with at least a read privilege;

To write first data into the zone space, and to add a data write request into the zone space, where the data write request carries the identifier of the position of the first data in the zone space, the identifier of the transmitting VM, and an operation type of the request; and To receive second data returned by the receiving VM, where the second data is obtained by the receiving VM after it obtains the data write request, obtains the first data according to the identifier of the position, and then operates correspondingly on the first data according to the operation type of the request.

In one or more embodiment, the physical partition communicates with the logic partition, and the logic partition communicates with another logic partition, in either of the following modes.

Remote Procedure Call Protocol (RPC) communication or standard socket interface based communication.

In one or more embodiment, the first operating system is run on the VM in the first core in either of a host mode and a guest mode.

An embodiment of the disclosure provides a computer readable storage medium on which there is stored computer program which, upon being executed by one or more processor, perform the method for running a plurality of operating systems in an industry internet operating system according to an embodiment of the disclosure according to any one of the embodiments above of the method.

In view of the above, in the embodiments of the disclosure, the first core of the multi-core CPU is run in the VMX mode using the preset virtualization technology, at least one VM is created in the first core of the multi-core CPU, and the first operating system is run on the VM in the first core, where each VM corresponds respectively to a logic partition; and the second operating system is run directly on the physical partition in the second core of the multi-core CPU, as such for the multi-core CPU, the preset virtualization technology is adopted for the first core to virtualize the first core, and the second core is not virtualized, so the logic partition and the physical partition coexist in the multi-core CPU, and furthermore the plurality of operating systems can be run concurrently in coordination on the multi-core CPU using the physical partition and the logic partition in the multi-core CPU to thereby accommodate application scenarios with different demands.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for running a plurality of operating systems in an industry internet operating system, wherein the industry internet operating system comprises application layer devices, cloud control layer devices, and field layer devices; the cloud control layer devices comprise an industry real-time cloud operating system which includes a multi-core Central Processing Unit (CPU), the industry real-time cloud operating system is configured to acquire and analyze data between the cloud control layer and the application layer, and to transmit a control instruction to the field layer; and the method is applicable to the industry real-time cloud operating system, and comprises:
running a first core of the multi-core CPU in a Virtual Machine eXtensions, VMX, mode using a preset virtualization technology, creating at least one Virtual Machine, VM, in the first core of the multi-core CPU, and running a first operating system on a VM in the first core, wherein each VM corresponds respectively to a logic partition; and
running a second operating system directly on a physical partition in a second core of the multi-core CPU;
wherein if a plurality of VMs are created in the first core of the multi-core CPU, then scheduling the plurality of VMs running the first operating system comprises:
if a first timer for controlling switch of a time window in a schedule, and a second timer for controlling switch of a primary frame period of time in the schedule are preset in the schedule, then determining whether a current instance of time lies in a non-idle time window in the schedule, wherein the primary frame period of time is a sum of lengths of respective time windows in the schedule; and
if the current instance of time lies in the non-idle time window in the schedule, then obtaining a first VM in a ready state from the non-idle time window, and running the first VM;
otherwise, obtaining a second VM in a ready state from a priority ready queue, and running the second VM.

2. The method according to claim 1, wherein the method further comprises:
managing the at least one VM using a Virtual Machine Monitor, VMM, in the first core, running the at least one VM in a non-root state, and running the VMM in a root state.

3. The method according to claim 1, wherein the method further comprises:
allocating corresponding computer system resources respectively for the first operating system and the second operating system according to a correspondence relationship between the computer system resources and the operating systems in a preset resource configuration table.

4. The method according to claim 1, wherein the VMs communicate as follows:
a transmitting VM determines a zone space in a shared memory for a receiving VM with at least a read privilege;
the transmitting VM writes first data into the zone space, and adds a data write request into the zone space, wherein the data write request carries an identifier of position of the first data in the zone space, an identifier of the transmitting VM, and an operation type of the request; and
the transmitting VM receives second data returned by the receiving VM, wherein the second data is obtained by the receiving VM after the receiving VM obtains the data write request, obtains the first data according to the identifier of the position, and then operates correspondingly on the first data according to the operation type of the request.

5. The method according to claim 1, wherein the first operating system is run on the VM in the first core in either of a host mode and a guest mode.

6. A non-transitory computer readable storage medium on which there is stored computer program, which, upon being executed by one or more processor, perform the operations in the method for running a plurality of operating systems in an industry internet operating system according to claim 1.

7. An apparatus for running a plurality of operating systems in an industry internet operating system, wherein the industry internet operating system comprises application layer devices, cloud control layer devices, and field layer devices; the cloud control layer devices comprise an industry real-time cloud operating system which includes a multi-core Central Processing Unit (CPU), the industry real-time cloud operating system is configured to acquire and analyze data between the cloud control layer and the application layer, and to transmit a control instruction to the field layer; and the apparatus is applicable to the industry real-time cloud operating system, and comprises:
one or more processors; and
a memory,
wherein one or more computer readable program codes are stored in the memory, and the one or more processors are configured to execute the one or more computer readable program codes to perform:

running a first core of the multi-core CPU in a Virtual Machine eXtensions, VMX, mode using a preset virtualization technology, to create at least one Virtual Machine, VM, in the first core of the multi-core CPU, and running a first operating system on a VM in the first core, wherein each VM corresponds respectively to a logic partition; and running a second operating system directly on a physical partition in a second core of the multi-core CPU;

wherein if a plurality of VMs are created in the first core of the multi-core CPU, then scheduling the plurality of VMs running the first operating system comprises:

if a first timer for controlling switch of a time window in a schedule, and a second timer for controlling switch of a primary frame period of time in the schedule are preset in the schedule, determining whether a current instance of time lies in a non-idle time window in the schedule, wherein the primary frame period of time is a sum of lengths of the respective time windows in the schedule; and if the current instance of time lies in the non-idle time window in the schedule, obtaining a first VM in a ready state from the non-idle time window, and run the first VM;

otherwise, obtaining a second VM in a ready state from a priority ready queue, and run the second VM.

8. The apparatus according to claim 7, wherein the one or more processors are configured to execute the one or more computer readable program codes to further perform:

managing the at least one VM using a Virtual Machine Monitor, VMM, in the first core, to run the at least one VM in a non-root state, and to run the VMM in a root state.

9. The apparatus according to claim 7, wherein the one or more processors are configured to execute the one or more computer readable program codes to further perform:

allocating corresponding computer system resources for the first operating system and the second operating system according to a correspondence relationship between the computer system resources and the operating systems in a preset resource configuration table.

10. The apparatus according to claim 7, wherein the VMs communicate as follows:

a transmitting VM determines a zone space in a shared memory for a receiving VM with at least a read privilege;

the transmitting VM writes first data into the zone space, and adds a data write request into the zone space, wherein the data write request carries an identifier of position of the first data in the zone space, an identifier of the transmitting VM, and an operation type of the request; and the transmitting VM receives second data returned by the receiving VM, wherein the second data is obtained by the receiving VM after the receiving VM obtains the data write request, obtains the first data according to the identifier of the position, and then operates correspondingly on the first data according to the operation type of the request.

11. The apparatus according to claim 7, wherein the first operating system is run on the VM in the first core in either of a host mode and a guest mode.

* * * * *